Figure 1:
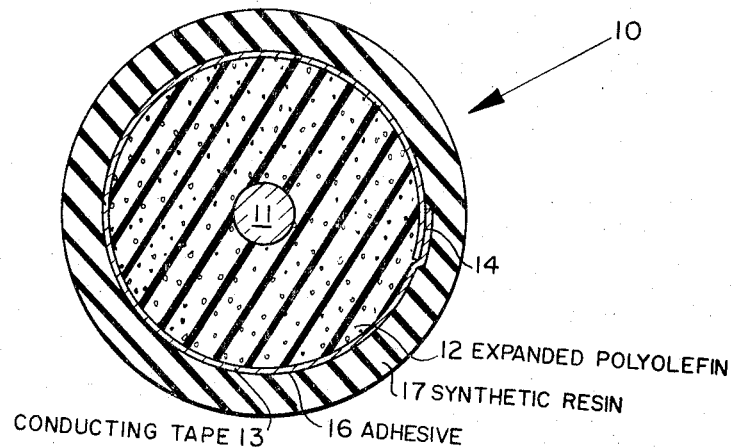

United States Patent Office 3,315,025
Patented Apr. 18, 1967

3,315,025
ELECTRIC CABLE WITH IMPROVED RESISTANCE TO MOISTURE PENETRATION
Harry M. Tomlinson, Sycamore, Ill., assignor to Anaconda Wire and Cable Company, a corporation of Delaware
Filed Dec. 30, 1964, Ser. No. 422,275
19 Claims. (Cl. 174—107)

My invention relates to electric cables and particularly to cables with expanded polyolefin insulation.

In electric cables for use at voice and carrier frequencies it is desirable to reduce the dielectric constant of the insulation to as low a value as possible and this is done by using an expanded polyolefin which contains a high proportion of air but still retains compressive strength enough to maintain a uniform distance between the conductors. The expanded insulation consists of polyethylene or polypropylene to which some gassing agent, of which several types are known, has been added. The agent decomposes during extrusion of the insulation but is held in compression by the pressure within the extruder. As the insulated strand leaves the extruder, however, the gas is free to expand, and since the polyolefin is heated to a soft plastic mass at this point, the gas forms a large plurality of small bubbles or voids in the plastic. Preferably, these bubbles occupy about 50% of the volume of the insulation.

The expanded polyolefin hereinabove described forms an ideal insulation for TV cables so long as no moisture penetrates into the insulation voids and it has been the practice to substantially prevent moisture penetration by covering the cable with a polyethylene jacket. Such jackets are not completely impermeable to water, however, particularly if they are submersed or kept wet for long periods.

I have found that if the outer conductor of a coaxial cable is applied with an overlapping longitudinal seam bonded by a suitable adhesive, and is tightly bonded to the cable jacket, moisture penetration can be so substantially prevented that no harmful change will occur in the electrical characteristics during rainstorms or other periods of long exposure to moisture. From considerations of electrical conductivity and the desirability of minimizing the cable diameter the inner conductor is made of copper. But the outer concentric conductor may be either copper or aluminum, aluminum being chosen for reasons of economy but raising an additional problem of electrolytic interaction if any moisture penetrates the dielectric.

In the case of coaxial cables the outer conductor is bonded to the jacket but I have also invented a twisted pair cable with expanded insulation in which a metallic shield is applied longitudinally and bonded to the jacket.

I have invented a coaxial cable comprising an inner copper conductor, a cylindrical wall of expanded polyethylene insulation surrounding the conductor and a conducting tape preferably of copper or aluminum, wrapped with an overlapping longitudinal seam around the wall of insulation. My cable has a thick, solid, abrasion resistant, synthetic-resin jacket, preferably polyolefin, surrounding the tape, and a layer of adhesive, which, preferably, is a copolymer of ethylene and acrylic acid, between the tape and the jacket, bonding them together over substantially the entire area of their contact with each other. The adhesive also seals the longitudinal seam in the conducting tape.

I have also invented a twisted-pair cable comprising two copper-conductors with a wall of expanded polyolefin insulation surrounding each conductor. The conductors with their insulation are twisted together to form a twisted pair having two opposing helical valleys. A layer of expanded polyolefin surrounds the pair and fills the valleys, and I have provided a shielding tape wrapped with an overlapping longitudinal seam surrounding this layer. A thick, solid, abrasion resistant, synthetic-resin jacket, preferably polyolefin, surrounds the tape. A layer of adhesive such, preferably, as an ethylene-acrylic acid copolymer, between the tape and the jacket, bonds the tape to the jacket over substantially the entire area of contact between them, and also seals the longitudinal seam.

A more thorough understanding of my invention can be gained from a study of the appended drawing.

Figure 2:
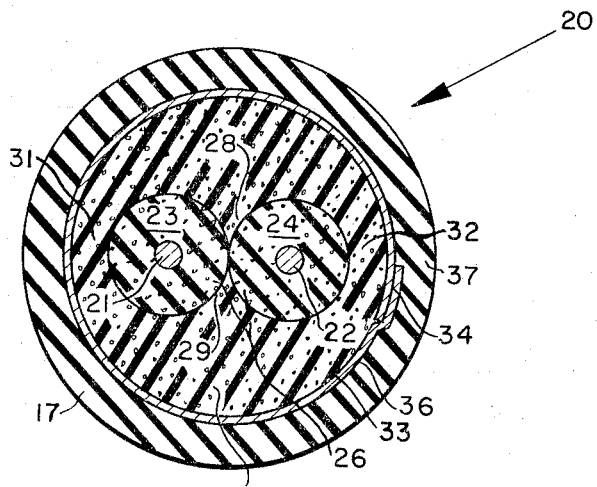

In the drawing:
FIGURE 1 shows a section of a coaxial cable made in accordance with my invention.
FIGURE 2 shows a section of a twisted-pair cable made in accordance with my invention.

The coaxial cable indicated generally by the numeral 10 has a copper conductor 11, preferably annealed to obtain the maximum conductivity. The conductor 11 is surrounded by an expanded polyolefin insulation 12. The insulation wall 12 is preferably extruded of polyethylene or polypropylene, polypropylene having greater structural strength, but both materials having low loss factors and dielectric constants. Polyethylene is easier to apply on existing equipment and is less expensive than polypropylene. Various methods are known for expanding the polyolefin insulation. These include the incorporation of a small percentage, e.g. ½%, of a blowing agent such as $p,p'$ oxybis (benzene sulfonyl hydrazide), or diazoaminobenzene, with the polyolefin being fed into the extruder. These agents decompose to liberate nitrogen at extruder temperatures. The nitrogen is dissolved in the plastic at the high pressures maintained within the extruder but is released to expand in the extruder die, or after the insulated strand has issued from the extruder. It is also known to supply pressurized gas directly to the extruder where it is dissolved in the polyolefin stock. In the manufacture of cables for high frequency use, expansion to a bulk density of at least 40% and up to 75% less than the density of solid polyolefin is desired.

An outer conductor 13 in the form of a thin strip (0.003 to 0.010 inch in thickness), of aluminum for aerial cable and of copper when the cable is intended to be buried is wrapped longitudinally around the insulation 12 with an overlapped longitudinal seam 14. The ratio of the diameter over the conductor 13 to the diameter of the conductor 11 is established by well known electrical considerations to be about 4.6. This means that an increase in the circumference of the conductor 11 will require an almost five-fold increase in the width of the strip from which the conductor 13 is fashioned and a corresponding increase in the cost of insulation and jacket stock. For this reason it is highly desirable to keep the size of the conductor 11 as small as possible within the limits imposed by the required conductivity; hence copper is used for the conductor 11.

The outer conductor 13 has its outer surface completely coated with an adhesive layer 16 that is capable of bonding securely to the metal and also of bonding to an outer protective jacket 17, preferably of polyolefin. A suitable adhesive is a copolymer of ethylene and acrylic acid such as the random copolymer containing about 8% by weight of acrylic acid and manufactured by copolymerizing ethylene and acrylic acid under high pressure. The preferred adhesive has a melt index of about 5, when measured by ASTM method D1238–62T using Condition E, i.e., 190° C. and 2160 grams load, and the expression "melt index" as used throughout this specification refers to the value determined by this method. The melt index, which measures a function of molecular weight and molecular weight distribution is generally used by persons skilled in polymer application arts for product specification and identification. A preferred adhesive of this nature sold commercially has the following properties:

| Test | ASTM Method | Value |
| --- | --- | --- |
| Melt Index, gm./min. | D1238 | 5.0 |
| Density (23° C.) gm./ml. | D1505 | 0.934 |
| Tensile Strength, p.s.i. | D412 | 3360 |
| Elongation, percent | D412 | 600 |
| Low Temperature Brittleness, °C. | D746 | <−76 |
| Stiffness, p.s.i.×$10^4$ | D747 | 1.5 |
| Hardness, Shore C | D676 | 85 |
| Dielectric Strength, volts/mil | D149 | 500 |
| Dissipation Factor (55 MC) | D150 | 0.0017 |
| Dielectric Constant (55 MC) | D150 | 2.41 |

A 2-mil thickness of the ethylene-acrylic copolymer extruded onto the copper or aluminum strip which thereafter is applied around the insulation 12 was found to bond satisfactorily to the jacket 17 and to the metal strip itself at the seam 14 when subjected to the heat of the extruder.

The cable is completed by extruding the jacket 17 about the adhesive-coated surface of the outer conductor 13. As stated, the jacket preferably is polyethylene or other polyolefin, but may be some other synthetic resin such as a vinyl polymer, e.g. polyvinyl chloride. At the extrusion temperature the tubular jacket becomes securely bonded over substantially the whole of its inner area to the outer conductor 13; and at the same time the longitudinal seam 14 in the latter is adhesively bonded by the adhesive coating 16 on the outer surface of the conductor.

The embodiment of my invention shown in FIGURE 2, and indicated generally by the numeral 20, is a cable similar to the coaxial cable of FIGURE 1 except that it has two copper conductors 21 and 22, respectively insulated with walls 23, 24 of expanded polyolefin insulation and then twisted together in a known manner to form a twisted pair 26 of a type well known for communication cables. When conductors are twisted together in this manner with uniform spacing they are suitable for use at a greater range of frequencies than coaxial cables and can be used for direct connection to TV cameras. A belt 27 of expanded insulation, equivalent to the insulation wall 12 of FIGURE 1, is applied over the twisted pair 26. This expanded material fills valleys 28, 29 in the twisted pair and, preferably, is similar electrically to the insulation 23, 24, with the result that the environment surrounding the conductors 21, 22 is effectively homogeneous. The belt insulation 27 surrounding the twisted pair 26 as shown in FIGURE 2 has narrow helical side web portions 31, 32 where the diameter of the shield is greater than the largest dimension through the twisted pair. This is a desirable condition from a manufacturing view since the belt 27 thereby is made stronger and remains more securely in place where the webs 31, 32 have substantial thickness. However, I also consider the belt 27 to "surround" the pair 26 if the latter is tangent to the outer surface of the belt insulation 27.

A shield 33 corresponding structurally to the outer conductor 13 of FIGURE 1 is applied about the belt insulation, and is overlapped at a seam 34. A coating 36 of the ethylene-acrylic acid adhesive described above, or other adhesive which bonds well to the metal of the shield and to an overlying tubular jacket 37, is preferably extruded on or otherwise applied to the outer surface of the metallic strip which forms the shield before the latter is wrapped about the belt insulation. As in the case of the outer conductor 13 of FIGURE 1, the shield preferably is a thin strip of copper or aluminum, about 0.003 to 0.010 inch thick.

The jacket 37, preferably of polyolefin but possibly of another synthetic resin such as polyvinyl chloride, is extruded over the adhesive-coated surface of the shield 33. The adhesive is activated during extrusion to bond the jacket, over substantially its entire surface area, to the metal shield; and the shield itself is securely bonded by the adhesive along its seam.

The tubular jacket 37 of FIGURE 2, and also the tubular jacket 17 of FIGURE 1, should be fairly thick, preferably from 0.030 to 0.075 inch in wall thickness, to insure against penetration of moisture into the cable and to permit normal bending of the cable (on short or long radii) without damage to the thin metal conductor bonded to its inner surface.

I claim:
1. A coaxial cable comprising:
   (A) an inner copper conductor,
   (B) a cylindrical wall of expanded polyolefin insulation surrounding said conductor,
   (C) an outer conducting tape around said wall of insulation wrapped with its edges overlapping to form a longitudinal seam,
   (D) a thick, solid, abrasion resistant synthetic-resin jacket surrounding said tape, and
   (E) a layer of adhesive,
       (a) between said tape and said jacket, and between the overlapped portions of said tape, bonding said jacket to said tape over substantially the entire area of contact between them, and
       (b) sealing the edges of said tape together at said seam.

2. The cable of claim 1 wherein said tape is aluminum.
3. The cable of claim 1 wherein said tape is copper.
4. A coaxial cable comprising:
   (A) an inner copper conductor,
   (B) a cylindrical wall of expanded polyolefin insulation surrounding said conductor,
   (C) an outer conducting tape wrapped around said wall of insulation with its edges overlapping to form a longitudinal seam,
   (D) a thick, solid, abrasion resistant polyolefin jacket surrounding said tape, and
   (E) a layer of adhesive,
       (a) between said tape and said jacket, and between the overlapped portions of said tape, bonding said jacket to said tape over substantially the entire area of contact between them, and
       (b) sealing the edges of said tape together at said seam.

5. The cable of claim 4 wherein said tape is aluminum.
6. The cable of claim 4 wherein said tape is copper.
7. The cable of claim 4 wherein said adhesive is a copolymer of ethylene and acrylic acid having a melt index of about 5.
8. The cable of claim 7 wherein said tape is aluminum.
9. The cable of claim 7 wherein said tape is copper.
10. A twisted-pair cable comprising:
    (A) two copper conductors,
    (B) a cylindrical wall of expanded polyolefin insulation surrounding each of said conductors,
    (C) said conductors with said insulation being twisted together to form a twisted pair having two opposing helical valleys,
    (D) a layer of expanded polyolefin surrounding said pair and filling said valleys,
    (E) a metallic shielding tape wrapped around said layer with its edges overlapping to form a longitudinal seam,
    (F) a thick, solid, abrasion resistant synthetic-resin jacket surrounding said tape, and
    (G) a layer of adhesive
       (a) between said tape and said jacket, and between the overlapped portions of said tape, bonding said jacket to said tape over substantially the entire area of contact between them, and
       (b) sealing the edges of said tape together at said seam.

11. The cable of claim 10 wherein said tape is aluminum.

12. The cable of claim 10 wherein said tape is copper.
13. A twisted-pair cable comprising:
(A) two copper conductors,
(B) a cylindrical wall of expanded polyolefin insulation surrounding each of said conductors,
(C) said conductors with said insulation being twisted together to form a twisted pair having two opposing helical valleys,
(D) a layer of expanded polyolefin surrounding said pair and filling said valleys,
(E) a metallic shielding tape wrapped around said layer with its edges overlapping to form a longitudinal seam,
(F) a thick, solid, abrasion resistant polyolefin jacket surrounding said tape, and
(G) a layer of adhesive
    (a) between said tape and said jacket and between the overlapped portions of said tape, bonding said jacket to said tape over substantially the entire area of contact between them, and
    (b) sealing the edges of said tape together at said seam,
    (c) said adhesive being a copolymer of ethylene and acrylic acid having a melt index of about 5.
14. The cable of claim 13 wherein said tape is aluminum.
15. The cable of claim 13 wherein said tape is copper.
16. A twisted-pair cable comprising:
(A) two copper conductors,
(B) a cylindrical wall of expanded polyolefin insulation surrounding each of said conductors,
    (a) said conductors with said insulation being twisted together to form a twisted pair having two opposed helical valleys,
(C) a layer of belt insulation of expanded polyolefin surrounding said pair and filling said valleys,
    (a) said belt insulation including webs which overlie the twisted pair at the opposite sides of its greatest transverse dimension and hold it securely against displacement,
(D) a metallic shielding tape wrapped around said belt insulation with its edges overlapping to form a longitudinal seam,
(E) a solid, abrasion resistant synthetic resin jacket surrounding said tape,
    (a) said jacket being from 0.030 inch to 0.075 inch in wall thickness, and
(F) a layer of adhesive
    (a) between said tape and said jacket and between the overlapped portions of said tape, bonding said jacket to said tape over substantially the entire area of contact between them and
    (b) sealing the edges of said tape together at said seam.
17. The cable of claim 16 wherein said tape is aluminum.
18. The cable of claim 16 wherein said tape is copper.
19. The cable of claim 16 wherein said jacket is polyethylene.

References Cited by the Examiner

UNITED STATES PATENTS

| | | | |
|---|---|---|---|
| 2,492,568 | 12/1949 | Gillis | 174—107 X |
| 3,233,036 | 2/1966 | Jachimowicz | 174—107 |

FOREIGN PATENTS

| | | |
|---|---|---|
| 570,379 | 7/1945 | Great Britain. |
| 638,002 | 3/1962 | Canada. |
| 1,261,740 | 4/1961 | France. |
| 942,730 | 11/1963 | Great Britain. |
| 968,061 | 8/1964 | Great Britain. |

LEWIS H. MYERS, *Primary Examiner.*

H. HUBERFELD, *Assistant Examiner.*